June 7, 1960          A. G. THOMAS          2,939,367

MACHINE TOOL SYSTEM

Filed Jan. 24, 1958          3 Sheets-Sheet 1

INVENTOR.
ALBERT G. THOMAS
BY
Diggins & LeBlanc
ATTORNEYS

June 7, 1960

A. G. THOMAS 2,939,367

MACHINE TOOL SYSTEM

Filed Jan. 24, 1958

INVENTOR
ALBERT G. THOMAS
BY Diggins & LeBlanc
ATTORNEY

June 7, 1960  A. G. THOMAS  2,939,367
MACHINE TOOL SYSTEM
Filed Jan. 24, 1958  3 Sheets-Sheet 3

INVENTOR
ALBERT G. THOMAS
BY Diggins & LeBlanc
ATTORNEY

United States Patent Office 2,939,367
Patented June 7, 1960

2,939,367

MACHINE TOOL SYSTEM

Albert G. Thomas, 612 N. McKean St., Butler, Pa.

Filed Jan. 24, 1958, Ser. No. 711,044

16 Claims. (Cl. 90—13)

This invention relates to an automatic machine tool and more particularly relates to an automatic machine tool having a digital or step motor control system.

In my Patents Nos. 2,774,922, 2,782,354 and 2,806,907, there are disclosed certain digital or step motors which may be used for automatically controlling machine tools in conjunction with a tape, printed or embossed cards or other records. According to the present invention, these motors are utilized in an improved automatic machine tool system employing an endless belt or tape or repeating record of any suitable kind to provide an improved automatic machining or shaping operation.

It is accordingly a primary object of the present invention to provide an improved automatic machine tool system.

It is another object of the invention to provide a machine tool whose movements are controlled by digital step motors and an endless belt or tape or other repeating record to machine or shape a symmetrical work piece in an improved manner.

It is another object of the invention to provide an automatic machine tool controlled by digital step motors and having a work piece mounting which is movable and adjustable in an improved manner under the control of an endless belt or tape.

These and further objects and advantages of the invention will become more apparent upon reference to the following specification and claims and appended drawings wherein:

Figure 1:
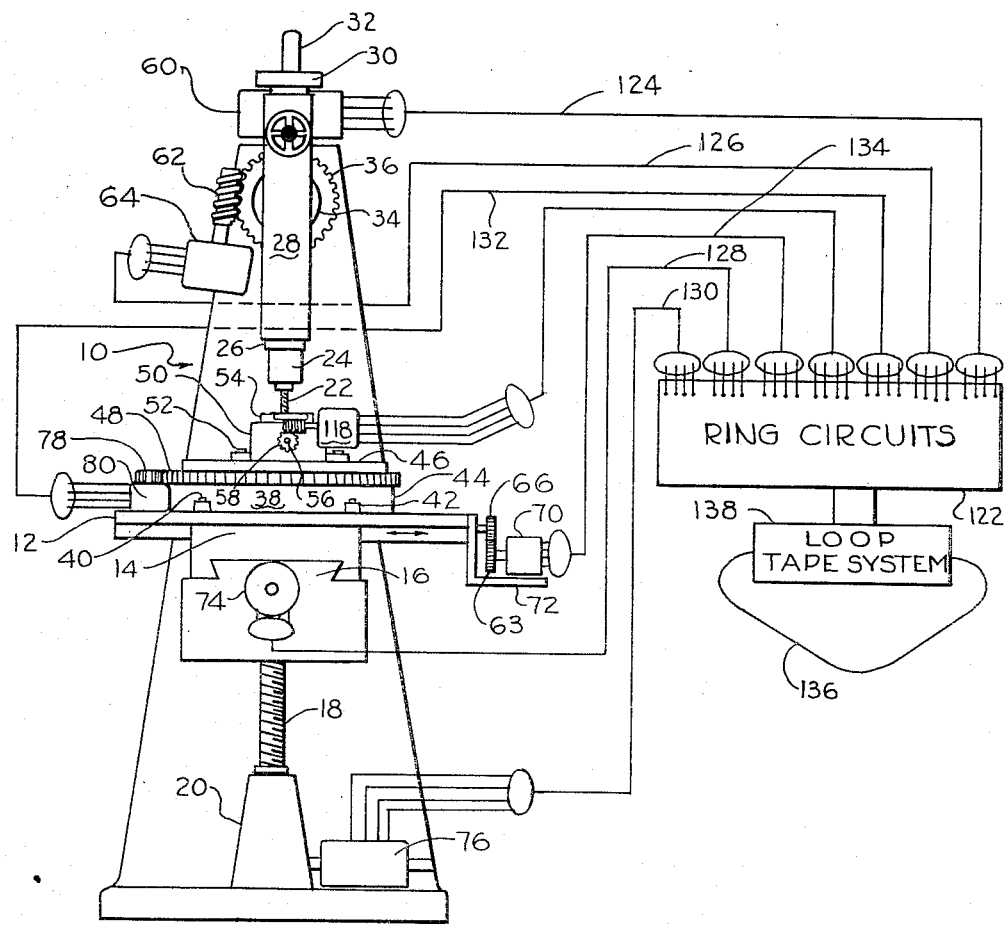
Figure 1 is a front elevation of a milling machine and associated step motors and control circuits therefor.

Referring more particularly to Figure 1, there is seen a milling machine having a table 12 which is slidable across a saddle 14. The saddle 14 is itself slidable on the knee 16 in a direction perpendicular to the longitudinal direction of movement of the table 12. The knee 16 may be raised or lowered by rotating a screw 18 which is rotatable in a bearing in pedestal 20.

A cutting tool 22 is clamped in spindle 24 which is rotatable in quill 26. The quill 26 is vertically movable in head 28 and may be driven by a pulley 30. The pulley 30 is keyed to a vertically movable shaft 32 which turns the spindle and cutting tool. The head 28 is secured to a cylindrical arm 34 which extends from a suitable bearing in the frame of the machine. The arm 34 is rotatable in the bearing and may be also slidably mounted therein, if desired. A gear 36 is keyed to the arm 34 for rotating the head 28.

A vise shown generally at 38 is bolted to the table 12 at 40 and 42 and consists of a base 44 having a plate 46 rotatably mounted thereon. A gear 48 is provided integral with plate 46 and serves to rotate this plate in a manner presently to be described. Mounted upon the plate 46 of the vise 38 is a vise jaw assembly indicated generally at 50 and secured to the plate 46 by bolts 52. The vise jaw assembly supports a work piece 54 beneath the tool 22. The work piece is rotatable on an axis perpendicular to the page of drawing on a shaft 56 which carries a gear 58.

From the foregoing it will be apparent that the work piece 54 is movable in a horizontal direction into the plane of the page by reason of saddle 14 sliding on knee 16 and is also movable in a horizontal direction parallel to the plane of the page by reason of table 12 sliding over saddle 14. The work piece may be raised or lowered by a rotation of screw 18 and may be rotated about an axis perpendicular to the plane of the page on shaft 56. In addition to this the angular disposition of the tool 22 with respect to the work piece may be changed by a rotation of the head 28 on the shaft 34.

The tool 22 is rotated by means of a step motor 60 which is connected by means of a belt to the pulley 30. The arm 34 is driven by gear 36 which meshes with a worm 62 driven by a step motor 64 to permit the head and tool to be tilted at any desired angle. A suitable screw hidden from view moves the table 12 from left to right or the reverse when turned, and is attached to a gear 66 which meshes with a gear 68 of a step motor 70 mounted on a bracket 72. A similar screw is provided for moving the saddle 14 perpendicular to the page of drawing and this screw is driven by means of a step motor 74.

The knee 16 is raised and lowered by the screw 18 through suitable gearing, not shown, which is driven by the step motor 76. The gear 48 which drives the vise plate 46 meshes with a gear 78 on a motor 80 for rotating the vise plate with respect to the tool.

Figure 3:
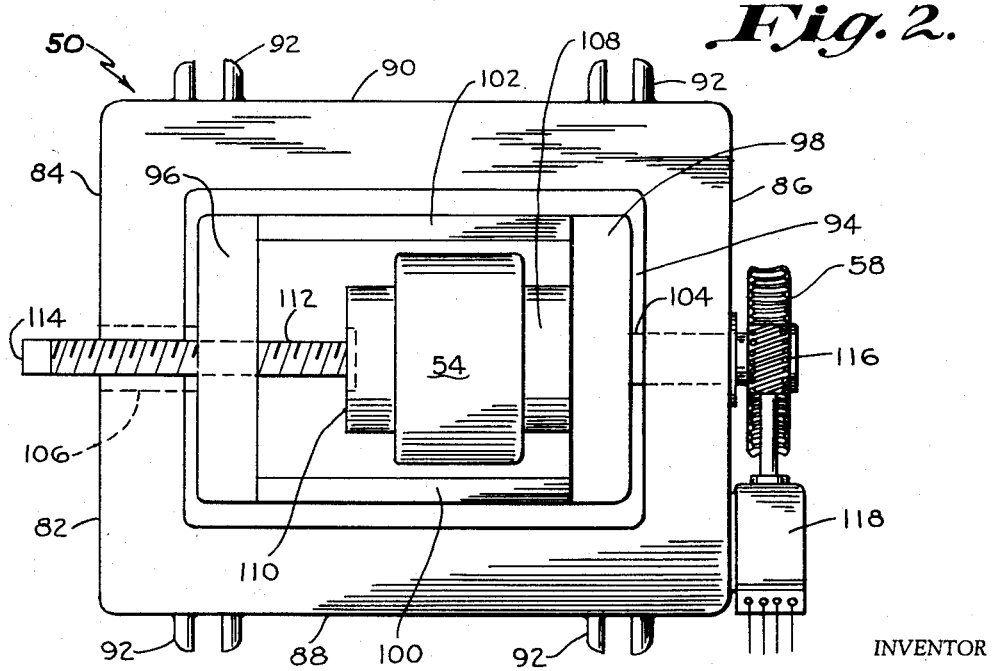
Figure 3 is a plan view of an improved vise utilized in conjunction with the milling machine of Figure 1.

Referring to Figure 3, the vise jaw assembly 50 comprises a heavy frame 82 of open rectangular shape having ends 84 and 86 and sides 88 and 90. Integral slotted ears 92 are provided for securing the jaw sub-assembly to the plate 46 by means of the bolts 52. A smaller open rectangular frame 94 is mounted within the heavy frame 82 and consists of ends 96 and 98 and sides 100 and 102. The smaller frame 94 has stub shafts 104 and 106 extending from the ends 98 and 96 thereof and these are received in bores in the ends 84 and 86 of the heavy frame 82.

Attached to the end 98 of the inner frame is the first vise jaw 108 engaging the work piece 54. The other side of the work piece is engaged by a movable vise jaw 110 having a suitable screw 112 rotatably mounted therein and received in a mating screw thread within the end 96 and stub shaft 106. The end of the screw 112 is square at 114 to provide for locking the work piece 54 between the vise jaws by means of a wrench in a conventional manner.

The work piece 54 and inner frame 94 are rotatable within the heavy frame 82 on stub shafts 104 and 106 and rotation is accomplished by means of a gear 58 which meshes with a worm 116 driven by step motor 118 attached to frame 82. It is evident that the work piece may be rotated through a full 360 degrees or any partial angle thereof. This provides a novel and highly desirable flexibility since the work piece may be shaped on one face and then turned through 90 degrees, 180 degrees, or through any angle desired, for the shaping of another face. The vise movement may be under manual or automatic control.

The step motors 60, 64, 70, 74, 76, 80 and 118 are of the type disclosed in my Patent No. 2,774,922. These motors advance in a forward or reverse direction in digital steps under the influence of a control system and are provided with braking means to substantially eliminate backswing by braking in sub-digital increments. It is important to the invention that this type of step motor be utilized since conventional step motors tend to oscillate at each step-wise advance, are unstable and possessed of limited torque.

The motors utilized according to this invention employ plural rotors or at least plural magnetic circuits which cooperate with plural stators and stator windings. These may be controlled either through individual commutating arrangements for each stator winding, such as by means of the system illustrated, for example, in Figure 2 of my Patent No. 2,774,922; or may be controlled by means of a single control medium such as a tape which itself controls a ring-type electronic firing circuit, as is illustrated by way of example in Figure 13 of my Patent No. 2,806,987. According to this invention the latter type system is utilized and is illustrated in a diagrammatic manner in Figure 1.

Referring to Figure 1, each of the step motors 60, 64, 70, 74, 76, 78 and 118 is connected to an associated ring circuit in a controller 122 by means of suitable multiple conductor cables 124, 126, 128, 130, 132 and 134 respectively. While the ends of these cables are shown as having four leads, this is by way of diagrammatic illustration only, it being understood that these cables will contain a sufficient number of leads to permit control of the step motors in the manner set out in my aforementioned patents. That is to say, according to certain embodiments of the step motor set out in those patents, a greater or lesser number of control leads may be necessary and will be supplied according to the requirements of the particular motor.

Each ring circuit may be controlled by a single line of indicia on a tape plus an additional indicia for controlling the direction of rotation, and all of the motors in the system may be controlled by a single tape bearing parallel rows of indicia, as is set out in detail in my aforementioned Patent No. 2,806,987 in connection with Figure 13 therein. According to this invention, this single tape is provided in the form of a loop 136 passing through a loop tape system shown generally at 138.

Figure 2:
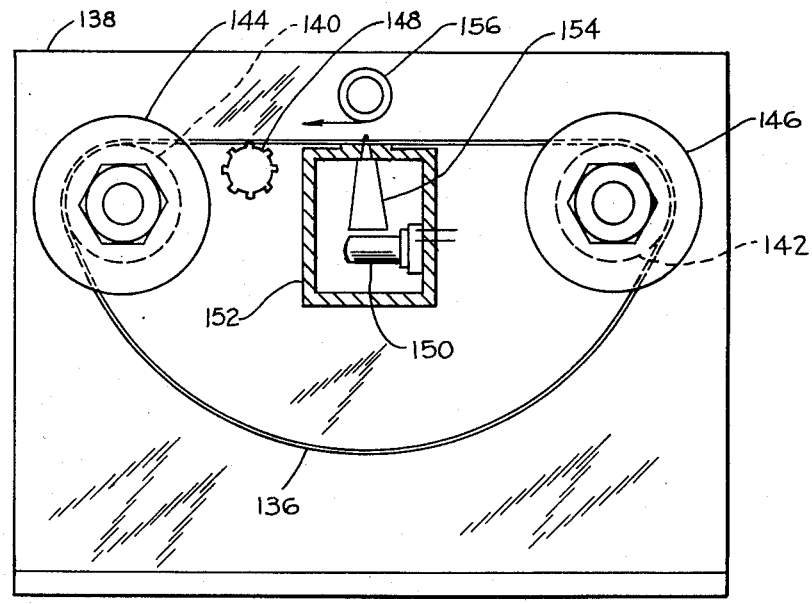
Figure 2 is a side elevation, partly in section, of a loop tape drive and sensing system for use in controlling the motors of Figure 1.

Referring to Figure 2, the loop tape system may consist of a first roller 140 and a second roller 142 over which the endless tape 136 passes. The rollers 140 and 142 may be provided with suitable flanges 144 and 146 for guiding the tape and the roller 140 may be driven by a suitable motor, not shown. A sprocket roller 148 is provided adjacent the roller 140 and is driven from the same source of power as the roller 140 to feed the endless tape 136 to the left in Figure 2.

The tape 136 contains a series of rows of indicia for controlling the step-wise advance of each individual motor and the direction of such an advance as described in my aforementioned Patent No. 2,806,987. Each row of indicia is associated with a photocell 150 and these may be mounted within separate cases 152 or a single case as will be described. Each photocell has associated therewith a plastic light guide 154 providing optical communication with the underside of the tape 136.

Where a plurality of photocells are mounted in the same container or casing 152, the light guides 154 may have their side surfaces coated with a light opaque material, such as heavy paint to confine the light passing therethrough to a given photocell. Alternatively, partitions may be used between photocells. The light for actuating the photocells may be provided by means of an elongated showcase type lamp 156 mounted above the tape transversely thereof.

In operation, the belt 136 is placed over the spools as shown in Figure 2 and the motor driving roller 140 and sprocket 148 are connected to a suitable current source. As the belt 136 is moved across the photocells, light from the showcase type lamp 156 strikes the photocell 150 when holes or translucent areas pass over the opening in the casing 152 so that light passes through the light guide 154. When the light strikes the photocell, this provides a control signal for actuating the ring control circuits described in detail in my Patent No. 2,806,987.

Since all step motors are controlled by means of a single tape it will be obvious to those skilled in the art that the various motions controlled by the motors are maintained in exact synchronism.

Figure 4:
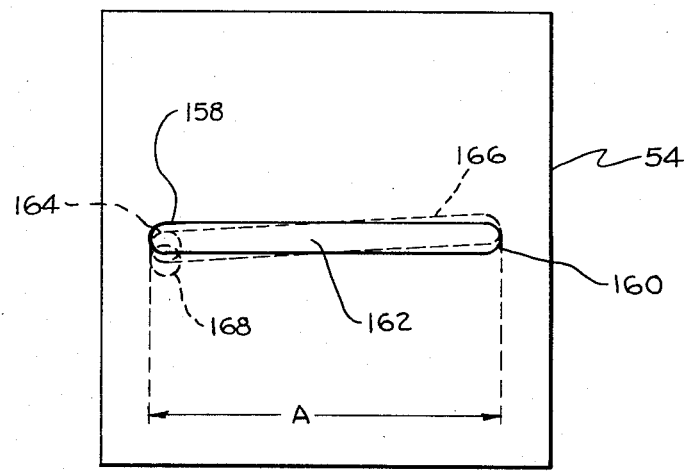
Figure 4 is a plan view of a work piece showing the effect of the sequential operations performed by the milling machine under the control of the step motors and associated control system.
Figure 5:
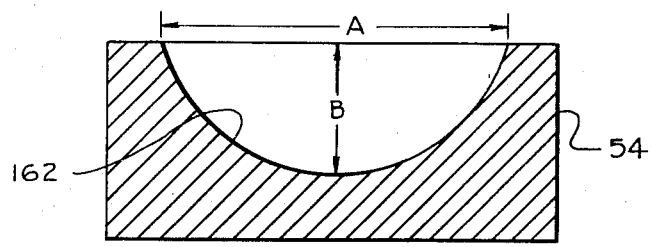
Figure 5 is a vertical section of the work piece of Figure 4.

Assuming that a work piece 54 is clamped between the jaws 108 and 110 of the vise assembly 50 as shown in Figures 1 and 3, the tape 136 may be provided with suitable indicia for actuating the various step motors in the following manner:

Referring to Figures 4 and 5, the tape 136 may be provided with indicia which, in a single complete revolution of the tape, causes step motor 70 to feed table 12 the distance A indicated in Figures 4 and 5, the table moving from the right to left in Figure 1, so that the work piece 54 moves from a position wherein the tool 22 is at 158 to a position wherein the tool is at 160.

During this same revolution of the tape 136, an additional row of indicia causes the step motor 76 to raise the table 12 the distance indicated at B in Figure 5 and to then lower the table this same amount in time controlled digital steps so that the work piece moves the distance A. During this revolution of tape 136, step motors 64, 74, 80 and 118 remain stationary under the control of the tape.

Step motor 60 drives the tool 22 and is driven at a speed determined by the indicia on the tape. While a step motor in this position is desirable in that the speed of the tool can be regulated in accordance with the particular cut which is being taken at the moment, it will be appreciated that the tool can be driven by a suitable conventional motor.

At the time that the tape 136 completes one circuit or revolution, it actuates step motor 80 to rotate the vise assembly 50 about a vertical axis and actuates motors 70 and 76 to return the work piece, so that the tool 22 moves relatively to the position shown at 164 in Figure 4. The tape goes through another loop or revolution causing step motors 70 and 76 to repeat their operations whereupon the tool retraces the curve 162 and cuts a slot as shown at 166 in Figure 4. At the end of this rotation of the tape 136 the step motor 80 is again energized to rotate the vise assembly 50 and the motors 70 and 76 are energized to return the work piece so that the tool now occupies the position shown at 168 in Figure 4. Motors 70 and 76 are then recycled by their respective control circuits to repeat the initially executed cut along the circular path B.

These actions are continuously repeated on each full rotation of the tape 136 until the work piece has made a complete revolution about a vertical axis and returns to the initial position. At this time a circular depression has been cut into the work piece by a large multiplicity of cuts made under control of a single tape of relatively small dimensions. A three dimensional machining operation is thus accomplished through a series of identical cuts between which the work piece is rotated.

The tape may be provided with indicia which cause motor 80 to rotate the work piece through small sequential angles which may or may not be equal, as desired. For most purposes the sequential angular rotations will be equal but this is not a necessary condition. It should be understood that several modes of operation are possible. For instance, motors 70 and 76 may produce shaping of the work piece on one side of the axis and then may cause return of the work piece as described or, these motors may continue to move the work piece to cause it to be shaped on the other side of the axis also; the motor 80 being stationary while the shaping is in progress. The latter mode of operation has the advantage that ineffective return movements of the motors 70 and 76 are not necessary. In most cases motors 70 and 76 will be stationary while motor 80 is rotating the work piece to a new angular position. In cutting some shapes however, it may be desirable for all three of these motors to be rotated concurrently. Either the tool or the work piece or both may be given movement to effect the desired shaping.

It is obvious that the tape could have a series of indicia or groups of indicia, each group causing motors 70 and 76 to produce a different configuration. There could be one or more marks, holes, or other indicia between each group to cause motor 80 to rotate the work piece through the desired angle or angles. In this case the cuts would be sequential but would not necessarily be identical. The endless tape or other repeating record means such as cards or the like would cause repeated group cuts but the individual cuts in each group could be different. The tape may still be quite short since it may be endless and may be repeatedly moved over the sensing device whether it be photocells, magnetic pick-ups or the equivalent.

It is obvious that the workpiece may be rotated about the axis of the tool or about another axis. Generally, it is desirable that the axis of rotation be in line with the tool axis. This tool will usually be a rotatable cutting tool but it may be a shaper type tool held in a movable chuck or the like.

Figure 6:
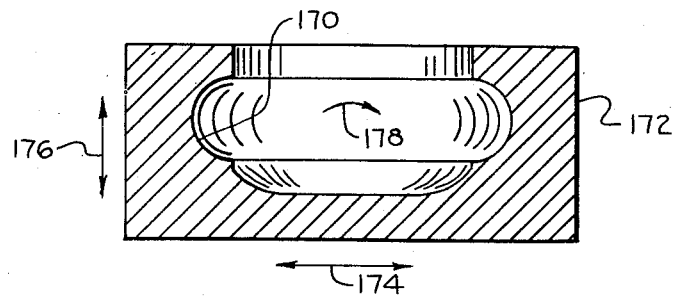
Figure 6 is a vertical section of another work piece showing the variety of contours which may be machined or shaped by the automatic machine tool of the present invention.

While a relatively simple cut has been described in connection with Figures 4 and 5 for purposes of illustration, those skilled in the art will appreciate the fact that an infinite variety of complex symmetrical cuts can be effectuated by the apparatus of my invention. Thus, referring to Figure 6, there is shown a more complex cut 170 in a work piece 172 wherein three work piece motions are involved in addition to rotation about a vertical axis. Thus, the work piece 172 must be moved from left to right as indicated by the arrow 174, must be moved vertically as indicated by the arrow 176, and must be rotated as indicated by the arrow 178. These movements are readily effected by the motors 70, 76, and 118. Alternatively, rather than rotating the work piece by means of motor 118, it would be possible to rotate the axis of the tool itself by means of motor 64 or these rotating motions may be combined.

In connection with the making of complex cuts, it should be pointed out that the movement permitted by the vise disclosed herein is quite important and constitutes a considerable improvement over any equipment available heretofore. That is to say, the vise assembly permits rotation of the work piece with respect to the table 12 and also permits rotation of the work piece on an axis perpendicular to this first axis of rotation by means of the motor 118. The work piece may be suitably centered or otherwise arranged in the vise by adjustment of the jaws 108 and 110.

From the foregoing it will be apparent that I have provided an improved machine tool apparatus including an improved vise assembly wherein it is possible to machine parts in a highly accurate manner through the use of a single loop tape of relatively small physical dimensions. This loop tape performs repeated circulations or rotations and during each rotation causes the work piece and tool to move relative to one another so as to effect a series of similar cuts until the entire machining operation has been completed. This novel arrangement minimizes the amount of control equipment required and shortens the machining time.

While this invention relates particularly to effecting symmetrical machining operations, it will be apparent to those skilled in the art that the equipment may also be utilized for other purposes and that the vise assembly disclosed herein may be of general utility.

This application is a continuation-in-part of my copending application Serial No. 497,755, now abandoned, filed March 29, 1955.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a machine tool system, a rotatable tool, means for rotating said tool about its axis, means for rotating a work piece in steps about said tool axis through a sequence of predetermined angles, means for causing a predetermined relative movement between said tool and said work piece with the axis of said tool remaining in one plane, and control means including a recycling record controlling said means for rotating and said means for causing relative movement, and means for recycling said record to sequentially produce said predetermined relative movement and said rotation of said work piece.

2. In a machine tool system, a rotatable tool, means for rotating said tool about its axis, means including a step motor for rotating a work piece about said tool axis through a sequence of steps, means including at least one step motor for causing a predetermined relative movement between said tool and said work piece with the axis of said tool remaining in one plane, and control means including a recycling record controlling said means for rotating and said means for causing relative movement, and means for recycling said record to sequentially produce said predetermined relative movement followed by said rotation of said work piece at least once during each recycling of said record.

3. In a machine tool system as set out in claim 2, said recycling record comprising an endless tape having a plurality of sequences of control characteristics thereon for controlling said means for rotating said work piece and said means for causing relative movement between said tool and said work piece.

4. In a machine tool system, a rotatable tool, means for rotating said tool about its axis, vise means including jaw portions for holding a work piece to be worked on by said tool, means mounting said vise means for rotation about a first axis parallel to said axis of said tool, a first step motor means for rotating said vise means about said first axis, at least one step motor for causing predetermined relative movement between said tool and said work piece with the axis of said tool remaining in a single plane, control means including a recycling record controlling said means for rotating and said means for causing relative movement, and means for recycling said record to sequentially produce said pre-determined relative movement followed by rotation of said work piece through an angle at least once during each recycling of said record.

5. In a machine tool system set out in claim 4, means mounting the jaw portions of said vise for rotation about a second axis at an angle to said first axis, and third step motor means for rotating said jaw portions about said second axis.

6. In a machine tool system as set out in claim 5, wherein said second axis of rotation of said jaw portions of said vise is perpendicular to said axis of rotation parallel to said axis of said tool.

7. In a machine tool system for producing complex cuts, a rotatable tool, means for rotating said tool about its axis, a table for supporting a work piece, said table being movable in a plane perpendicular to the axis of said tool, a first step motor means for moving said table, a member mounted on said table and carrying a jaw assembly for mounting a work piece, a second step motor means fixed with respect to said table and drivingly engaging said member to cause rotation thereof, means on said member mounting said jaw assembly for rotation about an axis perpendicular to the axis of rotation of said member, a third step motor means fixed with respect to said member and drivingly connected to said jaw assembly to cause rotation thereof, said step motors being of the digital type having sub-digital braking means to substantially eliminate back-swing between digital steps, control means including a recycling record for controlling said step motor means, and means for recycling said record to sequentially move said jaw assembly past said tool followed by rotation of said jaw assembly through an angle at least once during each recycling of said record.

8. In a machine tool system as set out in claim 7, said record controlling said step motor means to sequentially move said jaw assembly and a work piece held therein relative to said tool to cause said tool to cut a groove in said work piece, to return said work piece, to rotate said work piece a fractional amount, and to repeat said operations.

9. In a machine tool a vise assembly for producing complex cuts comprising a base, a member rotatably mounted on said base and carrying a jaw assembly for mounting a work piece, a first step motor means fixed with respect to said base and drivingly engaging said member to cause rotation thereof, means on said member mounting said jaw assembly for rotation about an axis perpendicular to the axis of rotation of said member, and a second step motor means fixed with respect to said member and drivingly connected to said jaw assembly to cause rotation thereof, said step motors being of the digital type having sub-digital braking means to substantially eliminate back-swing between digital steps.

10. In a machine tool system for producing complex cuts, a rotatable tool, means for rotating said tool about its axis, a vise for holding a work piece to be worked on by said tool, means mounting said vise for rotation about a first axis parallel to said axis of said tool, a first step motor means for rotating said vise about said first axis, said step motor means having locking means which permits free rotation in one direction but locks said motor to confine rotation in the opposite direction to less than one step, means mounting said vise for rotation about a second axis at an angle to said first axis, and a second step motor means for rotating said vise about said second axis, said second step motor means having locking means which permits free rotation in one direction but locks said motor to confine rotation in the opposite direction to less than one step.

11. In a machine tool system, a tool, means for supporting said tool, means for rotating a work piece about an axis through a sequence of predetermined angles, means for causing a predetermined relative movement between said tool supporting means and said work piece in a direction forming an angle with said axis, and control means including recycling record means controlling said means for rotating and said means for causing relative movement, and means for recycling said record means to sequentially produce said relative movement and said rotation of said work piece.

12. In a machine tool system, a tool, means for supporting said tool, vise means including jaw portions for holding a work piece to be worked on by said tool, means mounting said vise means for rotation about an axis, a first step motor means for rotating said vise means about said first axis, at least one step motor for causing pre-determined relative movement between said tool supporting means and said work piece in a direction at an angle to said axis, control means including recycling record means controlling said motors, and means for recycling said record means to produce sequentially said pre-determined relative movement followed by rotation of said work piece through an angle.

13. In a machine tool system, a tool, vise means including a base member and rotatable means supported thereby for holding a work piece, means including a step motor for effecting rotation of said holding means through an angle, and means for producing relative movement between said tool and said vise means.

14. The system as described in claim 13, said means for producing relative movement including record means for controlling said relative movement.

15. In a machine tool system, a tool, vise means including a base member and rotatable means supported thereby for holding a work piece, said holding means and work piece being rotatable about a substantially horizontal axis, means including a step motor for effecting rotation of said holding means about said axis, and means for producing relative movement between said tool and said vise means in a direction forming an angle with said axis.

16. In a machine tool system, a tool, vise means including a base member and rotatable means supported thereby for holding a work piece, said holding means and work piece being rotatable about a substantially horizontal axis, means including a step motor for effecting rotation of said holding means about said axis, said step motor being of the digital type having sub-digital braking means to substantially eliminate back-swing between digital steps, and means including controlling record means for producing relative movement between said tool and said vise means.

References Cited in the file of this patent

UNITED STATES PATENTS

| | | |
|---|---|---|
| 2,710,934 | Senn | June 14, 1955 |
| 2,758,515 | Smith | Aug. 14, 1956 |
| 2,774,922 | Thomas | Dec. 18, 1956 |
| 2,806,987 | Thomas | Sept. 17, 1957 |
| 2,871,767 | Thomas | Feb. 3, 1959 |

FOREIGN PATENTS

| | | |
|---|---|---|
| 292,881 | Great Britain | June 28, 1928 |